June 2, 1953 R. E. J. NORDQUIST 2,640,586
VALVE MECHANISM WITH OIL COLLECTING DEVICE
Filed Aug. 23, 1949
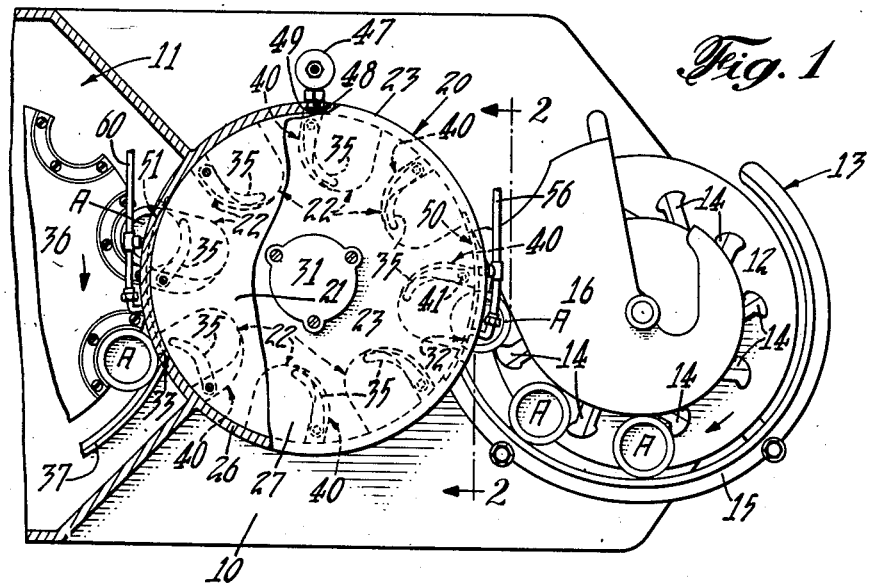
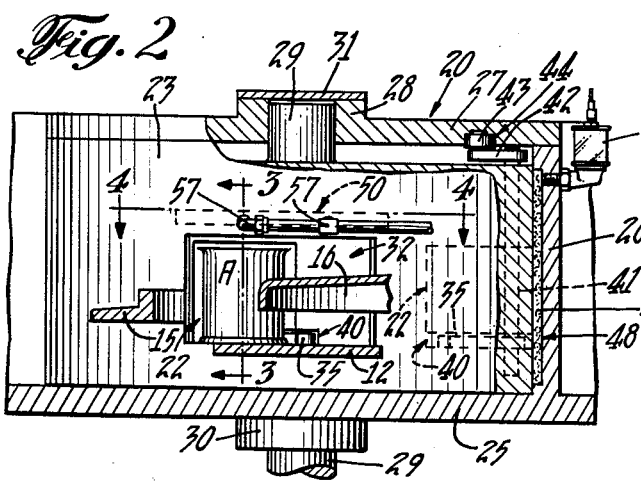
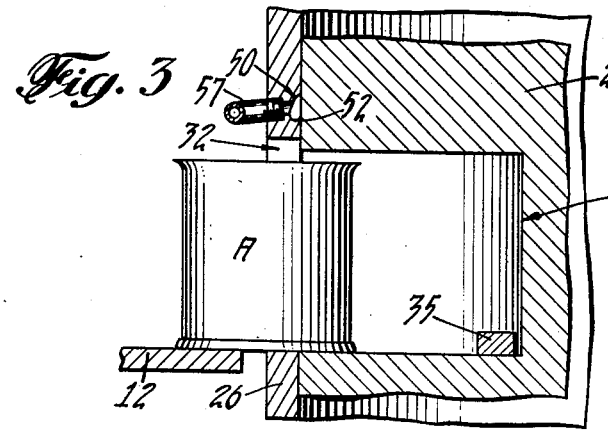
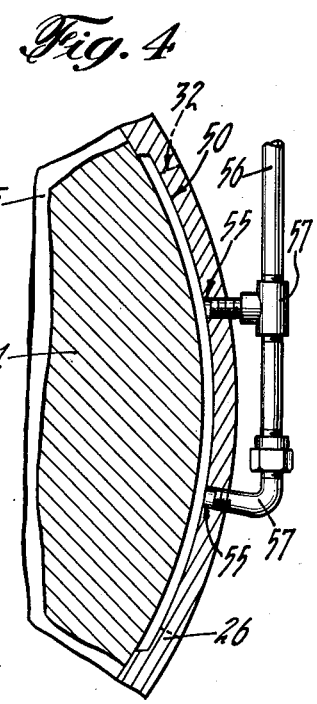
INVENTOR.
RONALD E. J. NORDQUIST
BY Charles H. Erne
Ivan D. Thornburgh
ATTORNEYS Patented June 2, 1953

2,640,586

UNITED STATES PATENT OFFICE 2,640,586

VALVE MECHANISM WITH OIL COLLECTING DEVICE

Ronald E. J. Nordquist, Maplewood, N. J., assignor to American Can Company, New York, N. Y., a corporation of New Jersey Application August 23, 1949, Serial No. 111,900

5 Claims. (Cl. 198—209)

The present invention relates to transfer valves for advancing articles such as containers or the like and has particular reference to means for preventing oil which is used to lubricate the valve seat from dripping onto the articles as they are being moved into or out of the valve.

In modern high speed equipment designed to treat containers and/or their contents, rotary valves are used extensively to transfer the containers from one section of the machine to another section. Thus, in vacuum closing machines, two such valves are ordinarily used, one to bring the containers from the outside atmosphere into the sealed vacuum chamber where the ends are seamed on, and the second to remove the sealed containers from the vacuum chamber and return them to the atmosphere. Rotary valves are similarly utilized in steam sterilizing machines, such as is illustrated in Patent 2,029,303 issued to C. O. Ball on February 4, 1936, entitled "Apparatus for and Method of Canning," to transfer the containers into and out of the sealed sterilizing chambers.

This type of valve is also utilized in various other types of machines and is well known to those versed in the art. It consists essentially of a movable valve body member, usually cylindrical or conical in shape and having container receiving pockets formed therein. The valve body member fits snugly within a stationary cylindrical or conical wall or valve seat which forms a part of the valve housing. This wall is provided with openings or ports through which the containers move as they pass into and out of the valve pockets.

In order to facilitate continuous, smooth high-speed operation of the unit, a lubricant such as oil or grease is utilized to reduce the friction between the movable valve body member and the stationary valve seat and prevent binding of the parts. It has been found, however, that this lubricant sometimes drips down from that part of the valve wall which overlies the valve ports and falls onto the containers as they are passed through the openings. This, of course, is an extremely undesirable condition, and is especially so if the containers are uncovered or uncapped, for in this instance the oil falls either directly into the contents of the containers, if they be filled, or onto interior portions of the containers which will come into contact with the subsequently introduced contents. When the contents of the containers are foodstuffs, such oil drippage can irremediably contaminate a whole pack and cause thousands of dollars worth of damage.

To overcome this situation, the present invention prevents oil drippage from the valve seat pocket by providing an oil receiving groove or channel in the valve seat wall directly over each valve seat opening. This groove is preferably connected to a source of pressure which is lower than the pressure in the valve pocket at the time the containers are passed through the opening. As a result of the pressure differential thus created, the lubricant is kept from dripping downwardly, and, if the differential is high enough, is even forced upwardly into the groove and removed through a pipe connected therewith.

An object of the invention, therefore, is to provide a transfer valve wherein oil or other lubricant will not drip onto the article being transferred.

Another object is to provide a pressure differential in an article transfer valve to positively prevent lubricant drippage which otherwise might cause spoilage of the articles and/or their contents.

A further object is the provision in a transfer valve of a lubricating oil collecting groove in the valve seat directly over and closely spaced from the valve port, which groove is connected to a source of pressure lower than the pressure in the valve pocket, whereby lubricating oil which otherwise would drip onto the transferred articles is forced into the groove.

Yet another object is the provision of means for removing the lubricating oil which is received in the oil collecting groove.

Numerous other objects and advantages of the invention will be apparent as it is better understood from the following description, which, taken in connection with the accompanying drawings, discloses a preferred embodiment thereof.

Referring to the drawings:

Figure 1 is a plan view, partly in section, of a portion of a container treating machine having incorporated therein a transfer valve embodying the present invention, parts being broken away;

Fig. 2 is an enlarged transverse sectional detail taken substantially along the broken line 2—2 in Fig. 1;

Fig. 3 is an enlarged vertical section taken substantially along the line 3—3 in Fig. 2 showing a container passing through the opening in the valve seat; and Fig. 4 is an enlarged fragmentary horizontal section taken substantially along the line 4—4 in Fig. 2.

As a preferred and exemplary embodiment of the instant invention, the drawings illustrate a portion of a vacuum closing machine of the type illustrated in United States Patent 2,039,338, issued to R. E. J. Nordquist et al. on May 5, 1936, and titled "Vacuum Closing Machine." The present drawings illustrate a simplified and modified form of the machine illustrated in this patent in order to more clearly bring out the details of the present invention, but it should be understood that many of the detailed features of the original Nordquist et al. machine are applicable to the instant machine.

The machine illustrated in the drawings comprises a stationary main frame 10 which supports the operating parts of the machine, including a closed vacuum chamber 11, only a fragmentary portion of which is shown herein. The containers, which in this instance are filled open-top metal cans A, are introduced from a suitable source of supply onto a rotating disc 12 of a timing unit generally designated by the numeral 13 (Fig. 1). It is believed unnecessary to go into the details of the timing unit 13 as it is clearly illustrated and described in the Nordquist et al. Patent 2,039,338. It will suffice to say that the cans are spaced apart the desired distance by accelerating fingers 14 as they advance along a curved path of travel as determined by guides 15 and 16 and are fed by the fingers 14 into the rotary valve mechanism designated by the numeral 20.

The valve mechanism 20 comprises a movable cylindrical valve body member 21 having formed therein a plurality of valve pockets 22 which receive the cans from the timing unit 13. Eight such pockets are herein illustrated in the present embodiment. The valve body 21 is snugly encased within a closing housing 23 to prevent leakage of air around the body 21 and into the vacuum chamber 11. The housing 23 includes a bottom wall section 25 and a cylindrical wall 26, the inner surface of which constitutes a valve seat. A top plate 27 is secured to the seat wall 26 and provides an upper bearing 28 for a valve body driving shaft 29, a lower bearing 30 being formed in the bottom housing wall 25 (see Fig. 2). A cap plate 31 is provided to seal the upper end of the bearing 28.

As illustrated in the Nordquist Patent 2,039,338, the timing unit 13 and the valve body member 21 are continuously rotated in timed relation from the main drive of the machine. The cans A are pushed from the disc 12 through an opening or valve port 32 (Figs. 2 and 3) formed in the cylindrical valve seat wall 26 and into the valve pockets 22 by the accelerating fingers 14. As the valve body continues its rotation, the cans are transferred to the interior of the machine adjacent the vacuum chamber 11. Here they are pushed out of the pockets 22 and through a second opening or port 33, similar to port 32 of the cylindrical valve seat wall 26, by fingers 35 located within the pockets 22. The pushed out cans are received in a rotary turret 36 in the vacuum chamber 11. A guide rail 37 cooperates with the turret 36 to further advance the cans to the seaming or other station in the machine.

In order to accommodate the fingers 35, the valve pockets 22 of the illustrated embodiment of the present invention are undercut at one side as at 40 (see Figs. 1 and 2). The fingers 35 are operated in timed relation with the other parts of the machine by oscillation of a vertical shaft 41 mounted in a bore in the valve body 21. This is effected through an arm 42, one end of which is secured to the upper end of the shaft 41. The other end of the arm 42 carries a cam roller 43 which operates in a camway 44 formed in the top plate 27. The camway 44 is shaped to effect the removal of the cans A from the pockets 22 at the desired time. The various features of the machine are further illustrated in more detail in the beforementioned Nordquist Patent 2,039,338.

It will be noticed that in this modified form of the machine illustrated in Nordquist et al. 2,039,338, no cover feed is shown, and the cans A are passed through the valve 20 and into the vacuum chamber 11 without having covers placed over their upper open ends. It is contemplated that a separate cover feed will be provided at a subsequent section of the machine in a manner similar to that disclosed in Patent 2,426,555 issued to S. S. Jacobs on August 26, 1947, entitled "Method of Filling and Sealing Containers," although the present invention is equally applicable to machines such as the Nordquist et al. where the cover is placed over the can prior to or as it enters the valve pocket.

As hereinbefore stated, the valve body 21 closely engages the vertical cylindrical wall 26 of the valve housing 23 to prevent air leakage into the vacuum chamber 11. In order to overcome the friction between the wall 26 and the valve body 21 produced by the constant high speed rotation of the valve body 21, an oil cup 47 is mounted on the valve housing 23 as disclosed in the Nordquist et al. patent above mentioned. The interior of the oil cup 47 communicates with a vertical groove 48 cut in the cylindrical valve seat 26. (See Figs. 1 and 2.) An absorbent wick 49 is embedded in the groove 48 and is kept saturated by the oil which flows by gravity from the oil cup 47. As the valve body 21 rotates, its cylindrical surface contacts the wick 49 and is thus constantly supplied with a thin film of lubricant which insures free movement of the valve body 21 within its seat in the wall 26.

During the operation of the machine, this lubricating oil gradually flows downwardly due to gravitational pull. In order to prevent undesirable oil drippage across the ports 32 and 33 through which the open top cans pass as they are fed into and out of the valve pockets 22, a substantially horizontal oil collecting groove 50 is provided over the port 32 and a similar groove 51 is provided over the port 33. Since the grooves 50 and 51 are substantially similar, it is believed that the following description of the construction and function of groove 50 and its associated elements will suffice for the purposes of this specification.

The groove 50 is of greater circumferential length than the port 32 and is closely spaced thereabove. It is roughly C-shaped in cross-section, being provided with a lower lip 52 which gives a trough-like effect to its lower portion.

Two short bore holes 55 serve to bring the groove 50 into communication with the outside of the housing 23. A pipe 56 is connected to the groove 50 through two fittings 57 which are screwed into the housing at the outer ends of bores 55. The pipe 56 is connected at its other end to a source of pressure which is lower than the pressure existing within the valve pockets 22 at the time the cans A are fed from the timing unit 13. Since each pocket 22 as it receives a can A from the unit 13 is open to the atmosphere, it is necessary to connect the pipe 56 to a source of vacuum. This may be done in any suitable manner, i. e. by connecting it directly to a small vacuum pump or by connecting it directly to the vacuum chamber 11.

As a result of the pressure differential thus created between the pocket 22 and the groove 50, the oil on the valve seat wall 26 between the groove and the port is forced upwardly into the groove. Some of the oil on the seat wall 26 immediately above the groove also enters the groove because of the vacuum therein and because of its natural downward gravitational flow. The oil which enters the groove is drawn off through the pipe 56 and can be recovered in an oil trap placed in the pipe at any suitable place. If desired, the pressure differential which urges the oil upwardly on the valve seat wall 26 between the port 32 and the groove 50, can be adjusted to approximately balance the gravitation pull on the oil, so that a minimum amount of oil will be drawn into the groove.

Returning now to the groove 51 and the port 33, it will be seen that the pockets 22 are exposed to the vacuum which exists in the vacuum chamber 11 at the time the cans A are ejected by the fingers 35 through the port 33. Hence a pipe 60, which is connected to the groove 51, must be connected to a vacuum pump or other source which supplies a higher vacuum than that existing in the vacuum chamber in order to prevent oil drippage in this portion of the valve.

It will be understood that this mechanism can also be utilized to prevent oil drippage in instances where the valve pockets are maintained at a greater than atmospheric pressure. This condition is encountered in various types of article treating machines, such as steam sterilizing or gas filling machines. In such cases, it may suffice to connect the groove to the outside atmosphere and thus maintain it at atmospheric pressure, although in some instances a positive vacuum will be required to balance the tendency of the oil to drip.

It is obvious that the present invention provides a simple and effective means for preventing spoilage due to lubricating oil contamination, and is a valuable and useful contribution to the art.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A valve mechanism for transferring articles relative to an enclosed chamber having a predetermined pressure, comprising a valve body member having pockets formed in the peripheral wall thereof for passing the articles while maintaining the chamber pressure, a valve seat closely engaging said peripheral wall of the valve body member and having a port through which said articles pass into said pockets, means for supplying a lubricant to the peripheral wall of said valve body member, and means located in said valve seat above said port and above said pockets for drawing lubricant upwardly and away from said articles as they pass through said port to prevent dripping of lubricant onto the articles.

2. A valve mechanism for transferring articles relative to an enclosed chamber having a predetermined pressure, comprising a movable valve body member having pockets formed in the peripheral wall thereof for passing the articles while maintaining the chamber pressure, a valve seat closely engaging said peripheral wall of the body member and having a port through which said articles pass into said pockets, means for supplying a lubricant to the peripheral wall of said body member, a lubricant collecting groove in said seat located directly above and closely spaced from the upper edges of said port and said pockets, and means for drawing the lubricant upwardly into said collecting groove and away from said articles as they pass through said port to prevent dripping of lubricant onto the articles.

3. A valve mechanism for transferring articles relative to an enclosed chamber having a predetermined pressure, comprising a movable valve body member having pockets formed in the peripheral wall thereof for passing the articles while maintaining the chamber pressure, a valve seat closely engaging said peripheral wall of the body member and having a port through which said articles pass into said pockets, means for supplying a lubricant to the peripheral wall of said body member, a lubricant collecting groove in said seat located directly over and closely spaced from the upper edges of said port and said pockets, and means for drawing the lubricant upwardly into said collecting groove and away from said articles as they pass through said port, said drawing means also removing lubricant from said collecting groove and preventing dripping of lubricant onto the articles.

4. A valve mechanism for transferring open top containers relative to an enclosed chamber having a predetermined pressure, comprising a valve seat having a port therein through which said articles pass, a movable valve body member for passing the containers in upright position while maintaining the chamber pressure, a pocket in the peripheral wall of said body member for holding the container and for aligning it with said port, said valve seat and the peripheral wall of said body member closely engaging each other, means for supplying a film of lubricant between adjacent surfaces of valve seat and valve body members, a lubricant collecting groove in said valve seat the lower edge of said groove being disposed directly over the upper edge of said port, said groove having a trough formed in the lower wall thereof adjacent said lower edge of the groove for catching excess lubricant, and vacuum means for drawing the lubricant upwardly into said collecting groove and away from the edge of said port to prevent lubricant from dripping into the open tops of the containers as they pass through said port.

5. In a valve mechanism for transferring containers into an enclosed chamber, the combination of an enclosed chamber having a pressure differing from atmospheric pressure, a valve body member having a plurality of pockets for holding the containers during transfer, a valve seat formed in the wall of the chamber and having a port through which said articles pass as they enter said chamber, means for rotating said valve body member in close sealing engagement with said valve seat and for aligning a pocket with said valve seat port, means for discharging a thin film of lubricant between adjacent surfaces of the valve and its seat, a lubricant collecting groove formed in said valve seat, the lower edge of said groove lying in closely spaced position above the upper edge of said port and extending beyond the sides of the port, the bottom wall of said groove having a trough formed therein adjacent said bottom edge for catching excess lubricant, and means connecting with said groove for creating a pressure lower than the pressure of aligned port and pocket to draw lubricant away from the port and into said groove to prevent dripping of lubricant onto containers passing through said port.

RONALD E. J. NORDQUIST.

References Cited in the file of this patent

UNITED STATES PATENTS

| Number | Name | Date |
|---|---|---|
| 2,039,338 | Nordquist et al. | May 5, 1936 |
| 2,264,844 | Hills | Dec. 2, 1941 |
| 2,299,119 | Yeomans | Oct. 20, 1942 |
| 2,393,997 | Lehmann | Feb. 5, 1946 |